United States Patent
Buchholz et al.

[11] Patent Number: 6,050,756
[45] Date of Patent: Apr. 18, 2000

[54] METHOD OF COOLING AND LUBRICATING A TOOL AND/OR WORKPIECE AND A WORKING SPINDLE FOR CARRYING OUT THE METHOD

[75] Inventors: Reinhard Buchholz, Tamm; Günther Späth, Kornwestheim; Wolfgang Horn, Pleidelsheim, all of Germany

[73] Assignee: Hüller Hille GmbH, Germany

[21] Appl. No.: 09/051,896

[22] PCT Filed: Oct. 4, 1996

[86] PCT No.: PCT/EP96/04323

§ 371 Date: Apr. 17, 1998

§ 102(e) Date: Apr. 17, 1998

[87] PCT Pub. No.: WO97/14530

PCT Pub. Date: Apr. 24, 1997

[30] Foreign Application Priority Data

Oct. 18, 1995 [DE] Germany ............ 195 38 762

[51] Int. Cl.⁷ .......................... B23Q 11/10; B23B 27/10
[52] U.S. Cl. ...................... 409/131; 408/1 R; 408/57; 408/59; 409/136; 409/135; 137/896; 222/145.6
[58] Field of Search ............... 408/57, 59, 58, 408/60, 56, 1 R; 409/135, 136, 137, 131, 132; 222/145.5, 145.6; 137/896

[56] References Cited

U.S. PATENT DOCUMENTS

| | | |
|---|---|---|
| 4,343,378 | 8/1982 | Bremer . |
| 4,957,398 | 9/1990 | Schneider et al. ............ 408/56 |
| 5,290,130 | 3/1994 | Beretta ............... 409/135 |
| 5,327,979 | 7/1994 | Du et al. ............... 408/57 |
| 5,419,732 | 5/1995 | Kaneko et al. ............ 451/28 |
| 5,601,386 | 2/1997 | Wells ............... 408/57 |
| 5,660,510 | 8/1997 | Taniguchi et al. ............ 408/56 |
| 5,690,137 | 11/1997 | Yamada ............... 408/57 |
| 5,788,433 | 8/1998 | Grund et al. ............ 409/136 |
| 5,890,849 | 4/1999 | Cselle ............... 409/136 |

FOREIGN PATENT DOCUMENTS

| | | | |
|---|---|---|---|
| 434023 | 6/1991 | European Pat. Off. ........ 408/57 |
| 33 45 721 A1 | 7/1984 | Germany . |
| 38 17 799 C1 | 11/1989 | Germany . |
| 42 00 808 A1 | 9/1993 | Germany . |
| 114878 | 9/1979 | Japan ............... 408/57 |
| 146639 | 6/1989 | Japan ............... 408/59 |

*Primary Examiner*—Steven C. Bishop
*Attorney, Agent, or Firm*—McGlew and Tuttle, P.C.

[57] ABSTRACT

The invention relates to a method of cooling and lubricating a metal-cutting rotating tool with a geometrically defined cutting element and/or the workpiece in the cutting zone. A coolant-lubricant and a carrier gas are fed separately into a tool shaft, brought together inside the rotating working spindle as close as possible to the cutting zone and directed via integral feed ducts onto the cutting element and/or cutting zone. Also disclosed is a device for applying this method. The coolant-lubricant and carrier gas are each introduced into a coolant reservoir completely or partially filled with a porous filler where they are mixed; the mixture is then fed directly into the cutting zone. Immediately behind the working spindle is a reservoir chamber filled completely or partially with a porous filler and comprising a substantially cylindrical closed casing with a coaxial feed aperture for the coolant-lubricant on one end face, radial feed apertures in the casing for the carrier gas and with an outlet aperture smaller than the casing diameter for the coolant-lubricant-carrier gas mixture in the end face of the casing opposite the feed aperture for the coolant-lubricant.

20 Claims, 4 Drawing Sheets

6,050,756

METHOD OF COOLING AND LUBRICATING A TOOL AND/OR WORKPIECE AND A WORKING SPINDLE FOR CARRYING OUT THE METHOD

FIELD OF THE INVENTION

The invention relates to a method for cooling and lubricating a metal-cutting rotating tool with a geometrically defined cutting edge and/or a workpiece in the cutting zone where a cooling lubricant and a carrier gas are supplied separately in a cutting spindle, brought together at the least possible distance from the cutting zone within the rotating cutting spindle and fed through feeder ducts integrated in the tool onto the cutting edge and/or cutting zone.

BACKGROUND OF THE INVENTION

Cooling lubrication in the engagement zone of tools belongs to the state of the art in technology. Previously known processes require substantial volumes of liquid, e.g. ranging from 10 to 1,000 l/min per tool. In the process the cooling lubricant is supplied from outside at for example 5 bar pressure to the point of engagement of the cutting edge.

The state of the art in technology also comprises methods according to which the cooling lubrication of the tool is accomplished from outside, utilizing small amounts of liquid by exploiting compressed-air spraying devices.

Previously known are also methods according to which the feed is effected to the cutting edge point of engagement through the working spindle and through the tool itself. Pressure rates of up to 100 bar are common practice in these methods.

Known from DE 42 00 808 Al is a working unit comprised of a driven rotating spindle where a chucking device for a drilling or milling tool is mounted at the spindle and where the spindle and the drilling or milling tool each are equipped with a central bore and where the drilling or milling tool are provided with an outlet port for feed of the lubricant or coolant to the cutting zone. The bores in this method are supplied with compressed air while the lubricant is fed through a separate thin pipe laid through the bores up into the interior of the tool end. The devices for varying and disrupting the feed of lubricant and coolant are located outside the cutting unit. This method only allows for a sluggish and time-retarded variation of the lubricant and coolant feed in the cutting zone.

DE 38 17 799 Cl moreover describes a rotary passage for fluids, particularly for machine tool spindles, where, at the transition from a stationary casing to a pivoted hollow shaft, springloaded barrier valves are arranged which allow for shutting-off the flow-through ducts for air and liquid. Air and the cooling lubricant here are mixed downstream of the barrier valves in a hollow shaft and supplied through a feeder duct to the cutting zone. To allow for what is called dry machining it is also provided for that only air will be blown through the hollow shaft and the feeder duct into the tool take-up when tools are changed.

The problem of dosing systems of this type for dry machining is that the coolant feed to the cutting zone cannot be interrupted quickly enough for tools change and not without post-running and that after a tools change a sufficient amount of cooling lubricant will be available in the cutting zone with a substantial delay only. In case of high spindle speeds it also involves the problem that the liquid medium is sluiced out from the current of air due to the centrifugal force and will deposit at the walls of the hollow shaft. It is above all this precipitation at the tube walls that causes a substantial delay in the supply of liquid to the cutting zone after tools change because it takes some time until the liquid has "crept" along tube walls to the tool. In case of extensions in the cross section it is moreover necessary to fill the expanded cavities with cooling lubricant before it reaches the tool. The dosage of the cooling lubricant air mixture at the tool is thus very unprecise and sluggish when known devices are implemented.

SUMMARY AND OBJECTS OF THE INVENTION

The primary object of the invention to propose a generic method and a working spindle in which the a.m. problems do not exist and which allow for a proper dosage of the cooling lubricant air mixture particularly in case of fast moving working spindles even immediately after automatic installation of a tool into the working spindle at the point of cutting.

According to the invention, a process for cooling and lubrication of a metal cutting rotating tool is provided. The process uses one of a geometrically defined cutting edge and/or a workpiece in a cutting zone and a cooling lubricant and a carrier gas are supplied separately, in a cutting spindle. The cooling lubricant and the carrier gas are brought together a small distance from the cutting zone within the rotating cutting spindle including: feeding the cooling lubricant and carrier gas into a cooling lubricant reservoir filled entirely or partly with a porous filling material; mixing intimately the cooling lubricant and carrier gas to form a mixture; and feeding the mixture directly to the cutting zone via fed through feeder ducts integrated in the tool.

According to another aspect of the invention, a cutting spindle is provided including a reservoir directly behind the tool. The reservoir is wholly or partly filled with porous filling material. The reservoir includes an essentially cylindrically closed shell with a coaxial feeder port for the cooling lubricant at one front end side, and with radial feeder ports located in the shell for the carrier gas. An outlet port is provided which is smaller in diameter than the shell for the mixture of cooling lubricant and carrier gas. The outlet port is located in the front-end side of the shell lying opposite to the feeder port for the cooling lubricant.

In the process being the subject of this invention the cooling lubricant and the carrier gas, preferably inside the rotating working spindle through suitable dosage elements, are given into a coolant reservoir filled entirely or partly with porous filler material, particularly made of porous sinter metal, mixed there and then the cooling lubricant—carrier gas mixture is directly supplied to the cutting zone. Upon introduction of the cooling lubricant into the reservoir through a central rear-mounted feeder port it is distributed in the whole reservoir. Even with fast rotating working spindles the porous sinter metal prevents that this cooling lubricant from settling down only at the external walls of the storage space. Hence the reservoir remains nearly entirely filled with cooling lubricant. If the carrier gas is fed in a suitable manner to the reservoir, it is enriched and mixed with the cooling lubricant and then supplied directly to the cutting zone. Through a separately controllable supply of cooling is lubricant and carrier gas via dosage elements located immediately upstream of the reservoir the cooling lubricant can be supplied to the carrier gas stream, particularly to the stream of air so that a sufficient amount of cooling lubricant will be available for example after a tools change even during the first impulse of air for lubrication of the cutting point. By way of the porous sinter metal existing in the reservoir it is feasible pursuant to this invention to ensure that after shutoff of the supply of cooling lubricant and carrier gas the reservoir will remain filled at least partly with cooling lubricant and that the cooling lubricant will not drain off and/or carry on dripping still further from the feeder pipe into the cutting zone as it does in devices built to the state of the art in technology. Even in case that the supply of air is shut off the cooling lubricant will remain distributed in the reservoir at least as evenly as required so that after restoration of the air flow in the reservoir the enrichment with the cooling lubricant will be initiated instantly and the required cooling lubricant—carrier gas mixture will be supplied to the cutting zone without any major delay. Pursuant to this invention the storage volume will be properly rated so that a sufficient enrichment of the carrier gas with cooling lubricant is achieved after the cooling lubricant feed has been shut-off and/or turned-on for a period of up to 30 sec, preferably for up to 15 sec. Especially if the cooling lubricant feed to the reservoir is evenly cycled, it can be prevented during cutting that the reservoir is blown empty of cooling lubricant and that cutting during this period is performed without cooling and in dry status.

In conformity with this invention it has turned out to be favorable to conduct the cooling lubricant and carrier gas on a differently long route through the filling material in the reservoir, particularly if the route of the blowing air in comparison with the cooling lubricant through the porous sinter material is very short it will thus entail in a favorable manner only a very small loss of pressure. The path (way) of the blowing air through the reservoir is so rated that a sufficient enrichment with cooling lubricant is always accomplished.

By way of the arrangement of dosing elements in the cutting spindle as provided for under this invention immediately before the introduction of media into the reservoir it is feasible pursuant to this invention to carry the cooling lubricant for cooling and lubrication of bearings and gaskets of the media passage partly or entirely in circulation even if the cooling lubricant feed to the reservoir is shut off and likewise it is also feasible to perform the adjustment of the cooling stream nearly independently of the dosed admixture of the cooling lubricant for cutting. It is important so because the cooling lubricant stream needed for cutting is much smaller than the cooling lubricant stream required for cooling. Depending on the machining task various pressure rates and mixing ratios of cooling lubricant and carrier gas will become necessary. By way of the separate control of the cooling lubricant and carrier gas pursuant to this invention the exact adjustment of pressure and mixing ratio becomes feasible.

It turned out to be favorable to feed the cooling lubricant from a dosage element discontinuously and/or in proper cycles directly to the reservoir. Thus it is also feasible to feed a very small stream of cooling lubricant even in case of what is called minimum lubrication or dry machining. Despite the discontinuous dosage of the cooling lubricant medium a continuous mixing with air is allowed to take place through the reservoir. Dosage devices that may demand a very small amount of cooling lubricant needed for dry machining normally cannot be accommodated in a spindle.

To carry out the method described a cutting spindle is proposed under this invention in which a reservoir entirely or partly filled with porous filling material, particularly with sinter metal, is located immediately behind the tool. This reservoir consists of an essentially cylindrical all-enclosed shell which may also reduce itself in diameter gradually towards the cutting zone. Located in this external shell at the rear end is a central coaxial feeder port for the cooling lubricant and an exit port located at the opposite end for the generated cooling lubricant—carrier gas mixture. Mainly radially arranged ports are provided for near the feeder port for the cooling lubricant in the shell of the reservoir to supply the carrier gas. By way of this arrangement of the cutting spindle a quick and intensive intimate mixture of media and/or enrichment of the carrier gas with cooling lubricant can be achieved. The space between the reservoir and the tool is kept as small as possible to let the mixture come to the cutting zone on the shortest possible way without causing a segregation, if any.

An advantageous type of execution of this invention provides for the arrangement of a duct in the lubricant reservoir and/or in the porous sinter material centrally in the interior, with said duct extending from the outlet port of the mixture up to shortly before the supply port of the cooling lubricant. By way of this duct it is achieved that the air can take a shorter way through the filling material and can subsequently stream through this duct up to the outlet port. On this way through this central duct the air can take-up, if required, cooling lubricant from the surrounding reservoir which is filled with filter material. 'Me outlet port for the mixture from the reservoir pursuant to this invention has got a diameter which is smaller than the diameter of the outer shell of the reservoir. By way of this reduction in diameter at the outlet side a reservoir for the cooling lubricant can develop in a simple manner in the ring-type space between the central duct and the outer shell. In this outer reservoir, particularly with fast turning spindles, the cooling lubricant can be retained by centrifugal force and be pressed outwardly. From this outer reservoir the cooling lubricant is conveyed into the central duct and thus to the cutting zone when air pressure and/or air stream flow are increased. The lubricant reservoir and the dosage element for the cooling lubricant feed as provided for under this invention may form a construction unit and be arranged in a clamp bolt designed and built as a hollow shaft. Longitudinal ducts for feed of carrier gas are expediently arranged between the clamp bolt and dosage element.

The clamp bolt is built into the spindle at the front and engages into the tool holder. Thus it is made feasible for the cylindrical shell installed in the filling material to reach directly into the bore of the tool holder. The clamp bolt being part of this invention with the lubricant reservoir and dosage element arranged in it is connected through a simple bolted union with the spindle and can be exchanged in its entirety for another clamp bolt which for example is only equipped with a central feeder pipe for full lubrication instead of the lubricant reservoir. Through this feeder pipe the cooling lubricant can be fed to the cutting zone from the appropriately designed dosage element without any extensions in cross section where cooling lubricant might deposit. By way of the exchangeability of the clamp bolt tools can thus be lubricated and cooled both with minimum volume cooling lubrication (dry machining) and fun lubrication using one and the same cutting spindle.

The various features of the novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
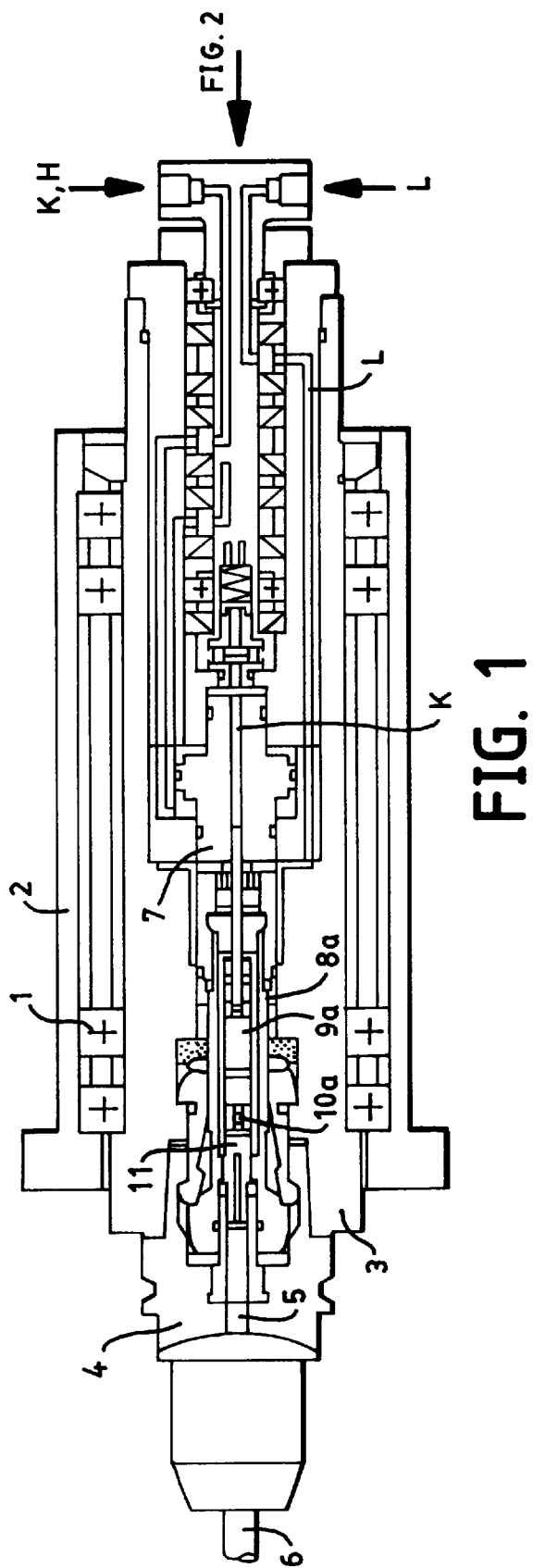
FIG. 1 is a cross sectional partially schematic view of a cutting spindle with a device for automatic tools change.

FIG. 1 illustrates a cutting spindle according to this invention. Only the essential design elements are addressed below. The fast rotating motor-driven cutting spindle 3 is supported through spindle bearing 1 in spindle casing 2. Illustrated only schematically at the front end is a tool holder 4 with an internal feeder duct 5 for the cooling lubricant (K)—air (L) mixture and the front-end tool 6. The tool can be exchanged in the known manner either manually or also automatically. FIG. 1 on the right side shows the radial feeders for carrier gas and/or air L and cooling lubricant K. Through various radial and axial ducts the cooling lubricant K and air L are supplied via clamp bolt 7 in dry machining to clamp bolt 8a and in wet machining and/or full lubrication mode to clamp bolt 8b.

Figure 2:
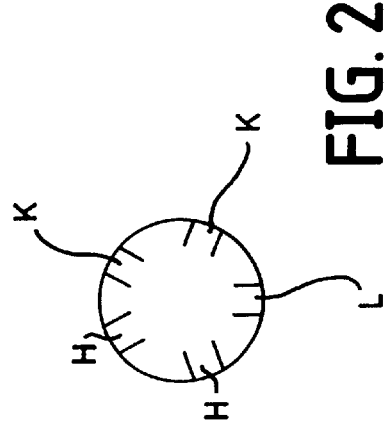
FIG. 2 is a sectional partial view in direction of arrow A of FIG. 1.

In case that a circulation of the cooling lubricant is implemented for cooling of bearings and gaskets, FIG. 2 indicates by an arrow both a charge and discharge of the cooling lubricant K. FIG. 2 moreover illustrates hydraulic connections H for automatic loosening and clamping of the tool.

Figure 3:
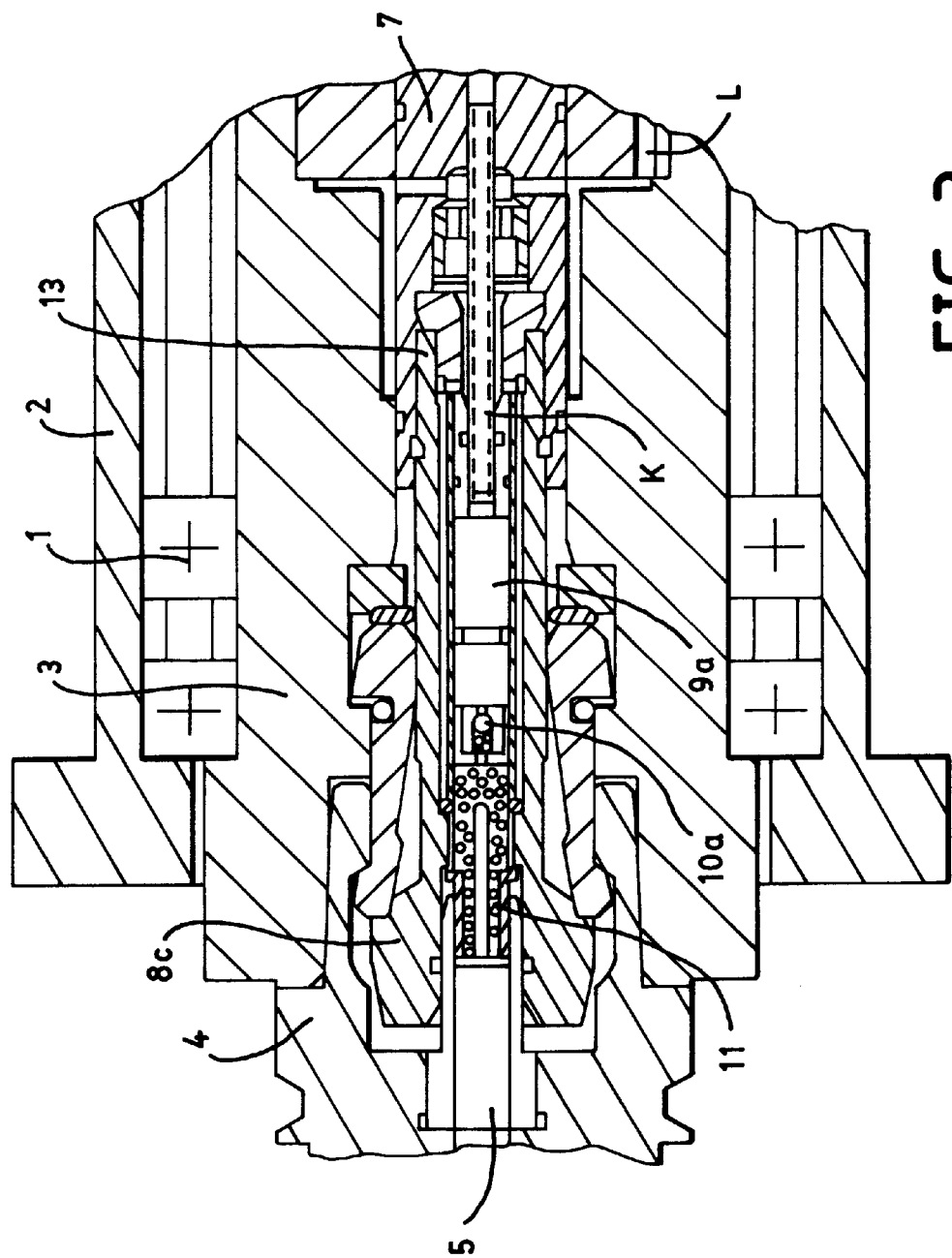
FIG. 3 is a cross sectional view showing an arrangement of a clamp bolt for dry machining in the cutting spindle.

The extract of FIG. 3 which is enlarged as compared with FIG. 1 shows the arrangement of a clamp bolt 8a for dry machining in spindle 3, with clamp bolt 8a consisting of an external tubelike sleeve with a male thread 13 for fixing in the spindle and a central dosage element 9a for the cooling lubricant K, a spring-loaded non-return valve 10a and the lubricant reservoir 11 according to this invention which is composed of porous sinter metal.

Figure 4:
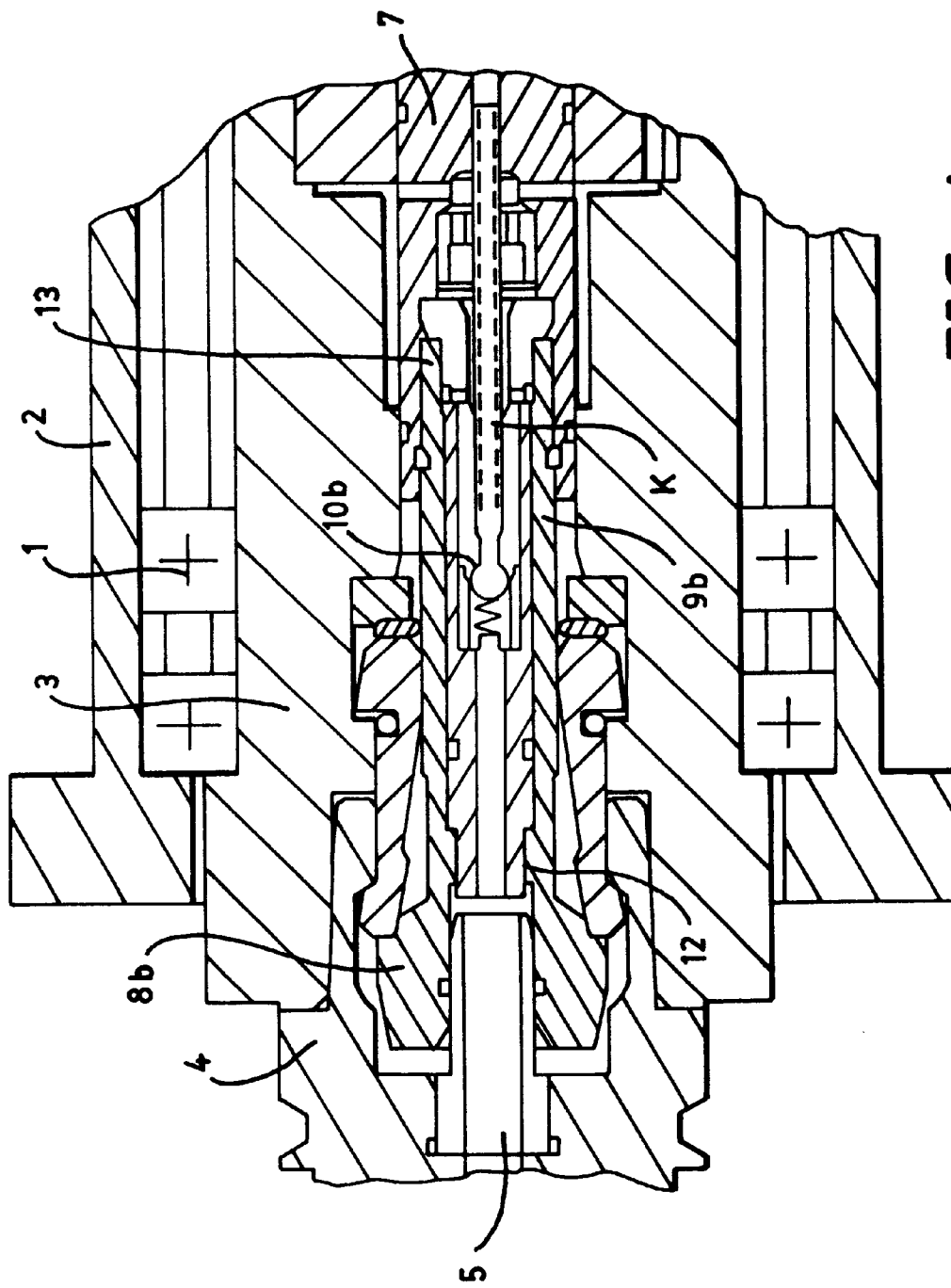
FIG. 4 is a cross sectional view of an arrangement of a clamp bolt for wet machining in the cutting spindle.

FIG. 4 shows the arrangement of a clamp bolt 8b for wet machining in spindle 3, with this clamp bolt being equipped with a dosage element designed for increased cooling lubricant supply, a spring-loaded non-return valve 10b and a feeder tube 12.

Figure 5:
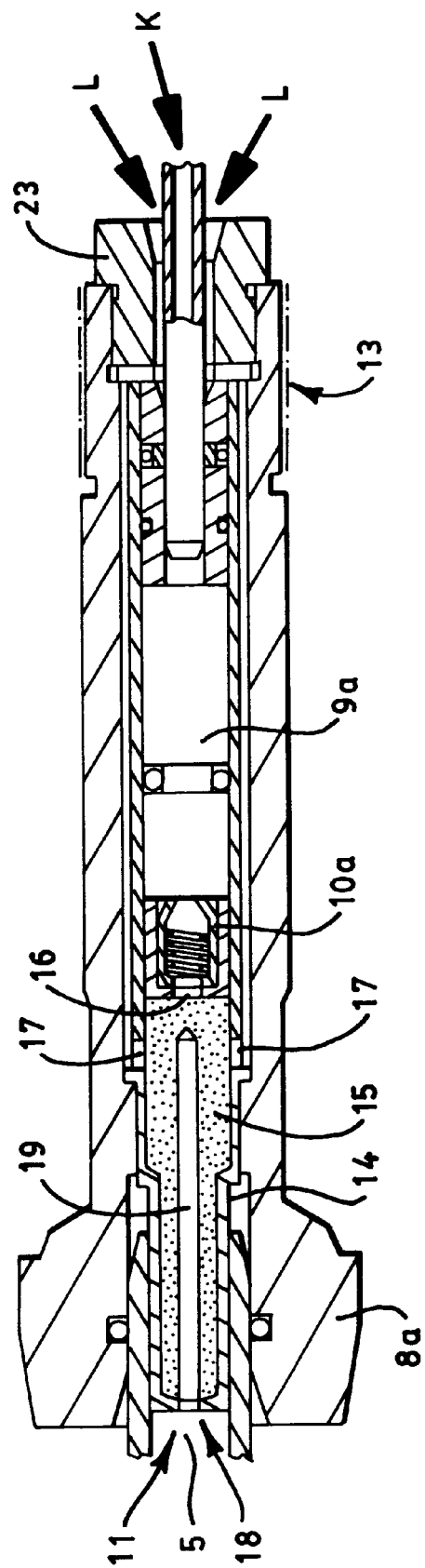
FIG. 5 is a cross sectional view of a clamp bolt for dry machining in a sectional view.

FIG. 5 finally more precisely illustrates the clamp bolt 8a for dry machining. Located in the clamp bolt 8a in its front-end area is the lubricant reservoir 11 filled with porous sinter metal 15 and provided with the cylindrical shell 14. The lubricant reservoir 11 is equipped with a feeder port 16 for the cooling lubricant, a feeder port 17 for air and a small central outlet port 18 for the cooling lubricant—air mixture. Inside the lubricant reservoir 11 there is also located a central duct 19. For assembly the internal construction unit made up of lubricant reservoir 11 and dosage element 9a can be shoved from the right side into clamp bolt 8a according to the invention and be held in place with the closure plug 23.

While a specific embodiment of the invention has been shown and described in detail to illustrate the application of the principles of the invention, it will be understood that the invention may be embodied otherwise without departing from such principles.

We claim:

1. A process for cooling and lubrication of a metal cutting rotating tool, the process comprising the steps of:

using one of a geometrically defined cutting edge in a cutting zone;

supplying separately, in a cutting spindle, a cooling lubricant and a carrier gas;

bringing together the cooling lubricant and the carrier gas a small distance from the cutting zone within the rotating cutting spindle including
      feeding the cooling lubricant and carrier gas into a cooling lubricant reservoir filled entirely or partly with a porous filling material,
      mixing intimately the cooling lubricant and carrier gas to form a mixture; and feeding the mixture directly to the cutting zone via fed through feeder ducts integrated in the tool.

2. The process according to claim 1, wherein the feed of each of the cooling lubricant and the carrier gas into the cooling lubricant reservoir is controlled separately.

3. The process according to claim 1, wherein a dosed admixture of cooling lubricant is effected via dosage elements arranged within the rotating cutting spindle.

4. The process according to claim 2, wherein a dosed admixture of cooling lubricant is effected via dosage elements arranged within the rotating cutting spindle.

5. The process according to claim 1, wherein the filling material is fining material and the cooling lubricant and the carrier gas are guided on paths of different lengths through the fining material.

6. The process according to claim 1, wherein the filling material in the reservoir remains at least partly filled with cooling lubricant after shutoff of the feed of cooling lubricant.

7. The process according to claim 1, wherein the carrier gas is sufficiently wetted with cooling lubricant from the reservoir after one of shutoff and turn-on of the cooling lubricant for a period of up to 30 sec.

8. The process according to claim 1, wherein the carrier gas is sufficiently wetted with cooling lubricant from the reservoir after one of shutoff and turn-on of the cooling lubricant for a period of up to 15 sec.

9. The process according claim 1, wherein the cooling lubricant is routed in a circulation mode for cooling and lubrication of bearings and gaskets of the cutting spindle when the cooling lubricant supply to the reservoir is shut-off.

10. The process according to claim 9, wherein the direction of flow of the cooling lubricant is reversed for cooling of the media passage.

11. The process according to claim 1, wherein the cooling lubricant is fed in one of a discontinuously and a cycled mode from a dosage element directly to the reservoir.

12. The process according to claim 3, wherein the cooling lubricant is fed in one of a discontinuously and a cycled mode from the dosage element directly to the reservoir.

13. A cutting spindle for a tool, comprising:

a reservoir directly behind the tool, the reservoir including an essentially cylindrically closed shell with a coaxial feeder port for receiving cooling lubricant at one front end side, and with radial feeder ports located in the shell for receiving a carrier gas and with an outlet port being smaller in diameter than the shell, said outlet port being located in the front-end side of the shell lying opposite to the feeder port for the cooling lubricant, said reservoir including porous filling material for mixing the cooling lubricant and the carrier gas.

14. The cutting spindle according to claim 13, wherein the porous filling material in its interior is provided with a duct which extends from the outlet port to shortly before one of said coolant lubricant and carrier gas feeder ports.

15. The cutting spindle according to claim 13, wherein said porous filling material is porous sinter metal.

16. The cutting spindle according to claim 13, further comprising a dosage element wherein the lubricant reservoir and a dosage element form a construction unit and are located in a clamp bolt designed and built as a hollow shaft.

17. The cutting spindle according to claim 16, wherein ducts for the supply of carrier gas are located in longitudinal direction between the clamp bolt and the dosage element.

18. The cutting spindle according to claim 16, wherein the clamp bolt with the lubricant reservoir provided for dry machining is exchangeable with a clamp bolt provided for full lubrication mode, with said clamp bolt provided for full lubrication mode being equipped with a central feeder tube instead of the lubricant reservoir.

19. A process for cooling and lubricating a cutting tool, the process comprising the steps of:

providing a cutting spindle for holding the tool;

providing a passage in the tool from a cutting portion of the tool to said spindle;

providing a reservoir in said spindle, said reservoir including a porous filling material and being in fluid connection with said passage of said tool;

supplying separately a cooling lubricant and a carrier gas into said reservoir of said spindle to mix said cooling lubricant and said carrier gas into a mixture;

feeding said mixture from the reservoir through said passage of said tool and to said cutting portion of the tool to cool and lubricate the tool.

20. The process in accordance with claim 19, wherein:

said supplying of said cooling lubricant and said carrier gas are performed to have said cooling lubricant and said carrier gas move along paths of different lengths in said reservoir;

said supplying of said cooling lubricant and said carrier gas are performed at a first end of said reservoir;

said feeding of said mixture is from an outlet port at a second end of said reservoir substantially opposite said first end, said outlet port being smaller in diameter than a diameter of said reservoir.

* * * * *